United States Patent
Grant

(10) Patent No.: US 6,352,319 B1
(45) Date of Patent: *Mar. 5, 2002

(54) TRACK SPIKE

(76) Inventor: David Grant, 13919 Struikman Rd., Cerritos, CA (US) 90703

(*) Notice: Subject to any disclaimer, the term of this patent is extended or adjusted under 35 U.S.C. 154(b) by 0 days.

This patent is subject to a terminal disclaimer.

(21) Appl. No.: 09/469,556

(22) Filed: Dec. 22, 1999

(51) Int. Cl.$^7$ ............................................... B62D 55/21
(52) U.S. Cl. ........................................................ 305/160
(58) Field of Search ................................. 305/180, 165, 305/160, 161, 162

(56) References Cited

U.S. PATENT DOCUMENTS

| | | | | |
|---|---|---|---|---|
| 3,760,514 A | * | 9/1973 | Egtvedt | 36/59 R |
| 4,120,930 A | * | 10/1978 | Lemelson | 264/225 |
| 4,875,616 A | * | 10/1989 | Nixdorf | 228/120 |
| 5,284,386 A | * | 2/1994 | Rubel | 305/180 |
| 5,628,129 A | * | 5/1997 | Kilgore et al. | 36/59 R |
| 5,641,214 A | * | 6/1997 | Kafka | 305/180 |
| 5,676,437 A | * | 10/1997 | Holmgren et al. | 305/180 |
| 5,716,112 A | * | 2/1998 | Staszak | 305/180 |
| 5,832,636 A | * | 10/1998 | Lyden et al. | 36/59 R |
| 5,897,177 A | * | 4/1999 | Bergstrom | 305/160 |
| 5,919,549 A | * | 7/1999 | Van et al. | 428/141 |
| 5,921,642 A | * | 7/1999 | Tschida | 305/180 |
| 5,979,084 A | * | 11/1999 | Grant | 36/134 |
| 6,138,386 A | * | 10/2000 | Singer et al. | 36/127 |

* cited by examiner

Primary Examiner—S. Joseph Morano
Assistant Examiner—Long Buo Nguyen

(57) ABSTRACT

A spike for track shoes is disclosed. The spike has a central section in a cylindrical configuration having a first enlarged exterior diameter. It also has an upper section in a generally cylindrical configuration extending upwardly from the central section with a threaded exterior face for removable attachment to and removable attachment from the track shoe of a wearer, the exterior diameter of the upper section being less than the exterior diameter of the central section. Lastly, a lower section is provided having an uppermost region with a generally circular cross-sectional configuration with an exterior diameter less than that of the central sections. The lower section also has an axis co-extensive with the central and upper sections and a lowermost region with a circular cross-sectional configuration. In addition, the lower section also has intermediate regions of varying diameters between the uppermost and lowermost regions, the intermediate regions having downwardly tapering generally cone-shaped lower edges. Lastly, the lower section also has two opposed planar sections extending downwardly on each side from the central section to an intermediate point thereof. Each spike is fabricated as a single piece from an ultra-lightweight ceramic material.

6 Claims, 3 Drawing Sheets

TRACK SPIKE

BACKGROUND OF THE INVENTION

1. Field of the Invention

The present invention relates to a new and improved track spike and, more particularly, pertains to providing a compression track spike of an ultra-lightweight ceramic material.

2. Description of the Prior Art

The use of track spikes of various designs and configurations is known in the prior art. More specifically, track spikes of various designs and configurations heretofore devised and utilized for the purpose of configuring track spikes through various methods and apparatuses are known to consist basically of familiar, expected, and obvious structural configurations, notwithstanding the myriad of designs encompassed by the crowded prior art which has been developed for the fulfillment of countless objectives and requirements.

The prior art discloses a large number of track spikes of various designs and configurations. By way of example, Japanese Patent Numbers 602082 dated 1983 and 656481 dated 1985 both disclose a track spike with a central tapering reverse from that of the present invention.

In this respect, the track spike according to the present invention substantially departs from the conventional concepts and designs of the prior art, and in doing so provides an apparatus primarily developed for the purpose of providing a compression track spike of an ultra-lightweight ceramic material.

Therefore, it can be appreciated that there exists a continuing need for a new and improved track spike which can be used for providing a compression track spike of an ultra-lightweight ceramic material. In this regard, the present invention substantially fulfills this need.

SUMMARY OF THE INVENTION

In view of the foregoing disadvantages inherent in the known types of track spikes of various designs and configurations now present in the prior art, the present invention provides a new and improved track spike. As such, the general purpose of the present invention, which will be described subsequently in greater detail, is to provide a new and improved track spike and methods which have all the advantages of the prior art and none of the disadvantages.

To attain this, the present invention essentially comprises a new and improved ultra-light compression track spike system comprising, in combination, a central section in a cylindrical configuration having a first enlarged exterior diameter; an upper section in a generally cylindrical configuration extending upwardly from the central section with a threaded exterior face for removable attachment to and removable attachment from the track shoe of a wearer, the exterior diameter of the upper section being less than the exterior diameter of the central section; and a lower section having an uppermost region with a generally cylindrical cross-sectional configuration with an exterior diameter less than that of the upper and central sections, the lower section also having an axis co-extensive with the central and upper sections, the lower section also having a lowermost region with a cylindrical cross-sectional configuration, the lower section also having intermediate regions of varying diameters between the uppermost and lowermost regions, the intermediate regions having downwardly tapering generally cone-shaped lower edges, the lower section also having two opposed planar sections extending downwardly on each side from the central section to an intermediate point thereof, each spike being fabricated as a single piece from an ultra-lightweight ceramic material.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved track spike which has all the advantages of the prior art track spikes of various designs and configurations and none of the disadvantages.

It is another object of the present invention to provide a new and improved track spike which may be easily and efficiently manufactured and marketed.

It is a further object of the present invention to provide a new and improved track spike which is of a durable and reliable construction.

An even further object of the present invention is to provide a new and improved track spike which is susceptible of a low cost of manufacture with regard to both materials and labor, and which accordingly is then susceptible of low prices of sale to the consuming public, thereby making such a track spike economically available to the buying public.

Even still another object of the present invention is to providing a compression track spike of an ultra-lightweight ceramic material.

Lastly, it is an object of the present invention to provide a spike for track shoes. The spike has a central section in a cylindrical configuration having a first enlarged exterior diameter. It also has an upper section in a generally cylindrical configuration extending upwardly from the central section with a threaded exterior face for removable attachment to and removable attachment from the track shoe of a wearer, the exterior diameter of the upper section being less than the exterior diameter of the central section. Lastly, a lower section is provided having an uppermost region with a generally circular cross-sectional configuration with an exterior diameter less than that of the central sections. The lower section also has an axis co-extensive with the central and upper sections and a lowermost region with a circular cross-sectional configuration. In addition, the lower section also has intermediate regions of varying diameters between the uppermost and lowermost regions, the intermediate regions having downwardly tapering generally cone-shaped lower edges. Lastly, the lower section also has two opposed planar sections extending downwardly on each side from the central section to an intermediate point thereof. Each spike is fabricated as a single piece from an ultra-lightweight ceramic material.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
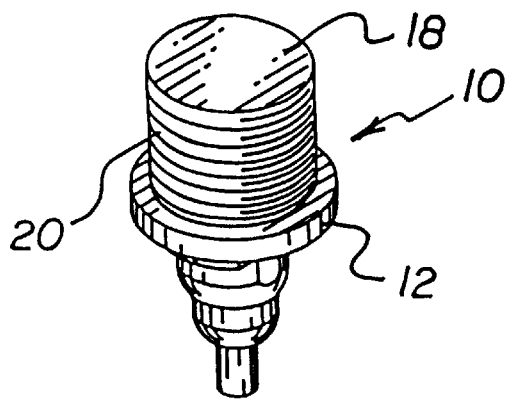
FIG. 1 is a perspective illustration of the preferred embodiment of the new and improved ultra-light ceramic compression track spike system constructed in accordance with the principles of the present invention.
Figure 2:
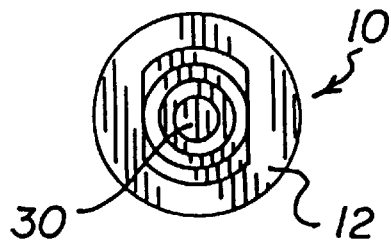
FIG. 2 is a bottom elevational view of the track spike shown in FIG. 1.
Figure 3:
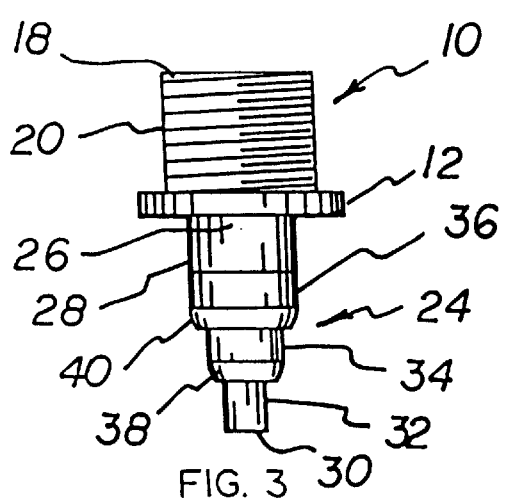
FIG. 3 is a front elevational view of the track spike shown in FIGS. 1 and 2.
Figure 4:
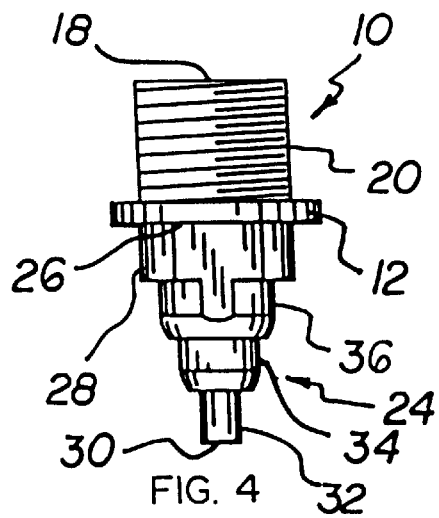
FIG. 4 is a side elevational view of the track spike shown in FIGS. 1 through 3.
Figure 5:
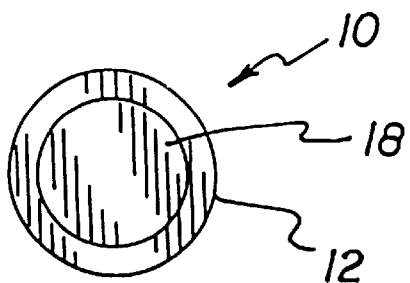
FIG. 5 is a top elevational view of the track spike of FIGS. 1 through 4.
Figure 6:
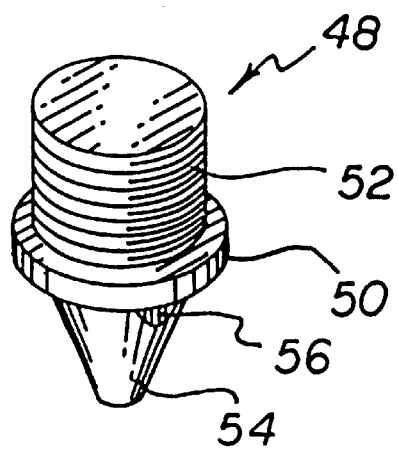
FIG. 6 is a perspective illustration of an alternate embodiment of the track spike similar to that shown in FIG. 1.
Figure 7:
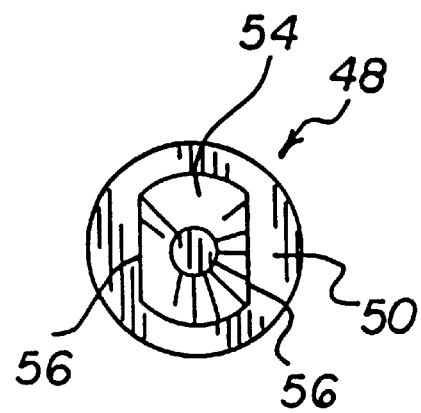
FIG. 7 is a bottom elevational view of an alternate embodiment of the track as shown in FIG. 6.
Figure 8:
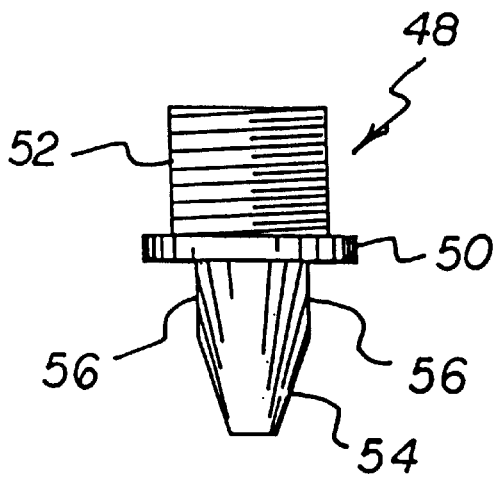
FIG. 8 is a front elevational view of an alternate embodiment of the track spike as shown in FIG. 6.
Figure 9:
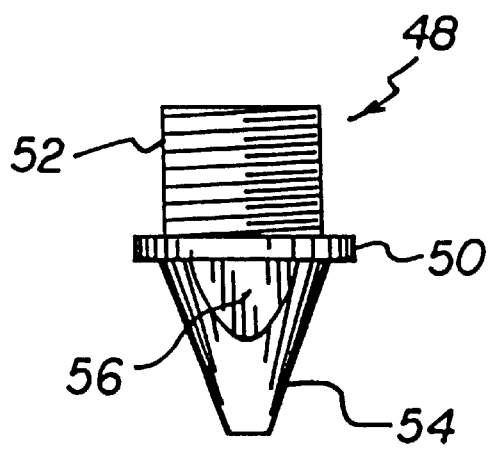
FIG. 9 is a side elevational view of an alternate embodiment of the track spike as shown in FIG. 6.
Figure 10:
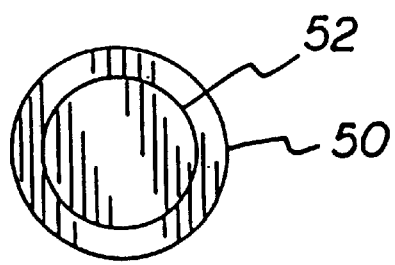
FIG. 10 is a top elevational view of an alternate embodiment of the track spike as shown in FIG. 6.
Figure 11:
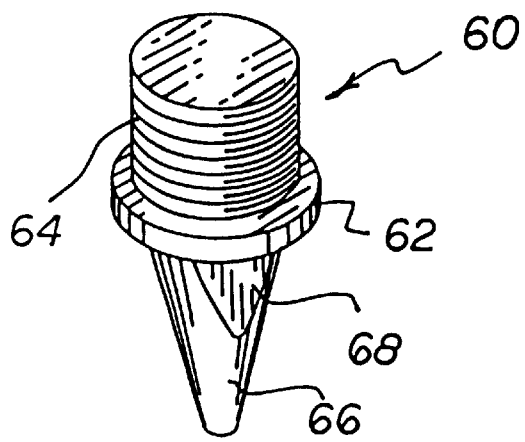
FIG. 11 is a perspective view of a track spike similar to that shown in the prior Figures, but illustrating another alternate embodiment of the invention.
Figure 12:
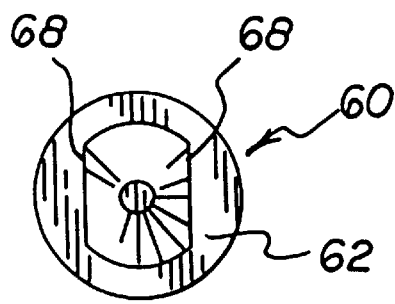
FIG. 12 is a bottom elevational view of another alternate embodiment of the track spike as shown in FIG. 11.
Figure 13:
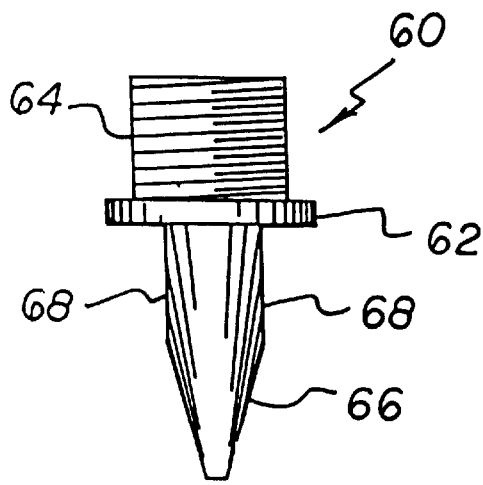
FIG. 13 is a front elevational view of another alternate embodiment of the track spike as shown in FIG. 11.
Figure 14:
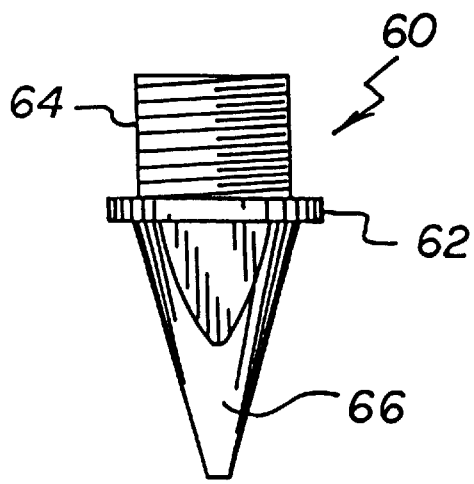
FIG. 14 is a side elevational view of another alternate embodiment of the track spike as shown in FIG. 11.
Figure 15:
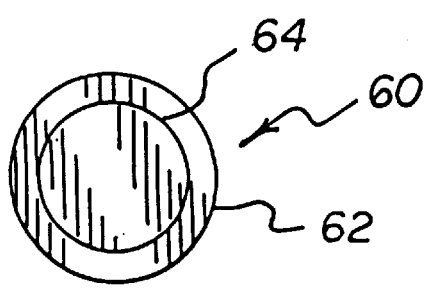
FIG. 15 is a top elevational view of another alternate embodiment of the track spike as shown in FIG. 11.

With reference now to the drawings, and in particular to FIGS. 1 through 15 thereof, the preferred embodiment of the new and improved track spike embodying the principles and concepts of the present invention and generally designated by the reference numeral 10 will be described.

The new and improved invention is in a new and improved ultra-lightweight ceramic compression spike system 10. Such system comprises a spike adapted to be removably received through threading onto an aperture in the sole of a track shoe. The spike includes a central section 12 in a cylindrical configuration. Such spike has a central axis with a first enlarged exterior diameter 14. The length of the central section is a small percent, less than 10 percent of the entire length of the spike.

The spike 10 is also fabricated to have an upper section 18. The upper section is formed in a generally cylindrical configuration. The upper section extends upwardly from the central section and includes a threaded exterior face 20. Such exterior face is for removable attachment to and from the track shoe of an wearer in a generally conventional manner. The exterior diameter of the upper section is less than the exterior diameter of the lower section.

Also provided as a component of the spike is a lower section 24. The lower section has an uppermost region 26. The uppermost region has a generally cylindrical cross-sectional configuration. It is formed to have an exterior diameter 28 less than the exterior diameter of the upper section and central section. The lower section has an axis which is co-extensive with the axis of the central and upper sections. The lower section is also formed to have a lowermost region 30. The lowermost region has cylindrical cross-sectional configuration with an exterior surface 32 forming a cross-sectional configuration. The lower section also has intermediate regions 34 and 36. Such intermediate regions are of varying diameters and are located between the uppermost and lowermost regions. These intermediate regions include a higher region and a lower region with the higher region having a diameter between the lower region and the uppermost region with the lower region having a diameter between the higher region and lowermost regions. The intermediate regions have downwardly tapering, cone-shaped lower edges 38, 40.

The lower section is also formed to have two opposed planar sections 44 of a similar configuration. Such planar sections extend downwardly on each side of the spike from the central section to an intermediate point therebetween located between about 40 percent and 60 percent of the axial length of the lower section.

In the preferred embodiment, each spike is fabricated as a single piece from an ultra-lightweight ceramic material. Specifically, various particulate ceramics are added to a matrix for the purposes of reinforcement. The particulate ceramics can comprise anywhere from 5–30% of the overall material. The particulate ceramics are selected from the group comprising: aluminum oxide; silicon carbide; boron carbide; or titanium carbide.

Shown in FIGS. 6 through 10 is an alternate embodiment of the invention. In such alternate embodiment, the spike 48 is formed to have a central section 50 and an upper section 52 similar to that of the primary embodiment. The lower section, however, is generally cone-shaped in configuration with a flat lower end. As such, a cone-shaped surface 54 is formed in a truncated cone-shaped configuration for the majority of its extent. Formed in the lower section are a pair of two opposed planar sections 56. Such planar sections extend downwardly on each side of the lower section from the central section to an intermediate point. The length of the planar sections is between about 40 percent and 60 percent of the length of the lower section.

Yet a further embodiment of the invention is shown in FIGS. 11 through 15. In such further alternate embodiment, the spike 60 is formed to have a central section 62 and an upper section 64 configured as in the primary embodiment. The lower section, however, is generally cone-shaped in configuration with a flat lower end. As such, a cone-shaped surface 66 is formed in a truncated cone-shaped configuration for the majority of its extent. Formed in the lower section are a pair of two opposed planar sections 68. Such planar sections extend downwardly on each side of the lower section from the central section to an intermediate point. The length of the planar sections is between about 40 percent and 60 percent of the length of the lower section. In this alternate embodiment of the invention, the lower section of the spike is formed to be about twice the axial length of the upper section. In the embodiment of FIGS. 6 through 10, the lower section is formed to be a length essentially equal to the upper section of the spike.

In the alternate embodiments of FIGS. 6 through 10 and FIGS. 11 through 15, the spike is preferably fabricated as in the primary embodiment to be of a single piece from an ultra-lightweight ceramic material.

The unique shape of the present invention is designed to compress the track without providing unwanted impact and stress to the athlete's feet and legs. The rounded corners provide a perfect balance between compressing the track and providing large impact loads as have previous designs. Through this concept the athlete gets the maximum energy return from the track. This shape provides maximum traction for starting, corners, hurdling and jumping without the impact caused by previous designs. This shape also prevents damage to the track by avoiding square corners, sharp penetrating points and the undercut design of previous products. Lastly, the shape prevents injuries to athletes by having no square corners or sharp penetrating points. The ceramic material used is one-third the weight of steel, thus providing a weight saving of approximately 10–15% of the weight of the shoe.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved ultra-light compression track spike system comprising:

a central section in a cylindrical configuration;

an upper section in a generally cylindrical configuration extending upwardly from the central section with a threaded exterior face for removable attachment to and removable attachment from the track shoe of a wearer;

a lower section having an uppermost region with a generally cylindrical cross-sectional configuration with an exterior diameter less than that of the upper and central sections, the lower section also having an axis co-extensive with the central and upper sections;

wherein the central, upper and lower sections are reinforced with particulate ceramic materials selected from the group comprising, aluminum oxide; silicon carbide; boron carbide; and titanium carbide.

2. A track spike comprising:

a central section, an upper threaded section and a lower section;

wherein the entire spike is integrally formed from an ultra-light weight ceramic material with an additive selected from the class of additives which includes aluminum oxide, silicon carbide, boron carbide and titanium carbide.

3. The track spike as set forth in claim 2 wherein the ceramic material includes between 5–30% aluminum oxide.

4. The track spike as set forth in claim 2 wherein the ceramic material includes between 5–30% silicon carbide.

5. The track spike as set forth in claim 2 wherein the ceramic material includes between 5–30% boron carbide.

6. The track spike as set forth in claim 2 wherein the ceramic material includes between 5–30% titanium carbide.

* * * * *